US012533536B2

(12) United States Patent
Puttaswamaiah et al.

(10) Patent No.: US 12,533,536 B2
(45) Date of Patent: Jan. 27, 2026

(54) INDICATORS FOR USE IN OXYGEN SYSTEMS

(71) Applicant: B/E AEROSPACE, INC., Winston Salem, NC (US)

(72) Inventors: Bhaskara Chikkanayakanahalli Puttaswamaiah, Tumkur (IN); Mayank Raj, Ranchi (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 947 days.

(21) Appl. No.: 17/719,103

(22) Filed: Apr. 12, 2022

(65) Prior Publication Data

US 2023/0191167 A1    Jun. 22, 2023

(30) Foreign Application Priority Data

Dec. 20, 2021   (IN) .............................. 202141059486

(51) Int. Cl.
| | |
|---|---|
| *A62B 9/00* | (2006.01) |
| *A62B 7/14* | (2006.01) |
| *A62B 18/08* | (2006.01) |
| *B64D 11/06* | (2006.01) |
| *B64D 45/00* | (2006.01) |
| *F21V 23/04* | (2006.01) |

(Continued)

(52) U.S. Cl.
CPC .............. *A62B 9/006* (2013.01); *A62B 18/08* (2013.01); *B64D 11/0632* (2014.12); *F21V 23/0442* (2013.01); *F21V 33/0076* (2013.01); *G08B 5/36* (2013.01); *A62B 7/14* (2013.01); *B64D 2045/007* (2013.01); *B64D 2231/025* (2013.01)

(58) Field of Classification Search
CPC ........... A62B 9/006; A62B 18/08; A62B 7/14; F21V 23/0442; F21V 33/0076; G08B 5/36; B64D 2045/007; B64D 11/0632; B64D 2231/025
See application file for complete search history.

(56) References Cited

U.S. PATENT DOCUMENTS

| | | |
|---|---|---|
| 7,298,280 B2 | 11/2007 | Voege et al. |
| 10,967,205 B2 | 4/2021 | Elliott et al. |
| (Continued) | | |

FOREIGN PATENT DOCUMENTS

| | | | | |
|---|---|---|---|---|
| CA | 2933599 C | * | 12/2019 | ............. A61B 5/024 |
| EP | 0364283 | | 4/1990 | |
| (Continued) | | | | |

OTHER PUBLICATIONS

European Patent Office, European Search Report dated Apr. 19, 2023 in Application No. 22211338.3.

(Continued)

*Primary Examiner* — Tu A Vo
(74) *Attorney, Agent, or Firm* — SNELL & WILMER L.L.P.

(57) ABSTRACT

An oxygen system for an aircraft may have a chemical oxygen generator; an oxygen mask; and a tube assembly extending from the chemical oxygen generator to the oxygen mask. The tube assembly may have a first tube and a second tube. The first tube defines a fluid conduit that fluidly couples the chemical oxygen generator to the oxygen mask in response to being in use. The second tube may be configured to house a plurality of lights therein.

20 Claims, 7 Drawing Sheets

(51) Int. Cl.
*F21V 33/00* (2006.01)
*G08B 5/36* (2006.01)

(56) References Cited

U.S. PATENT DOCUMENTS

| | | | | |
|---|---|---|---|---|
| 2005/0011282 A1* | 1/2005 | Voege | ............... | A61M 16/0841 73/861.44 |
| 2006/0048782 A1* | 3/2006 | Gossweiler | ............ | A62B 23/02 128/205.12 |
| 2006/0107745 A1* | 5/2006 | Aziz | ................. | A61M 16/0078 73/700 |
| 2015/0047638 A1 | 2/2015 | Robey | | |
| 2015/0174359 A1 | 6/2015 | Elliott et al. | | |
| 2015/0196784 A1* | 7/2015 | Elliott | ...................... | A62B 7/14 128/205.23 |
| 2016/0325123 A1* | 11/2016 | Elliott | ...................... | A62B 7/14 |
| 2017/0189727 A1 | 7/2017 | Hunter et al. | | |
| 2018/0126194 A1 | 5/2018 | Salin et al. | | |
| 2020/0070772 A1 | 3/2020 | Kim et al. | | |
| 2020/0164233 A1* | 5/2020 | Tomasena | ................ | A62B 7/12 |

FOREIGN PATENT DOCUMENTS

| | | | | |
|---|---|---|---|---|
| EP | 2371411 A1 * | 10/2011 | ........ | A61M 16/0051 |
| EP | 3284673 A1 * | 2/2018 | ............. | B64D 11/00 |
| EP | 3284673 | 3/2021 | | |
| WO | WO-2008028196 A2 * | 3/2008 | ............. | A62B 9/006 |
| WO | WO-2015095532 A2 * | 6/2015 | ............. | A61B 5/024 |

OTHER PUBLICATIONS

European Patent Office, European Office Action dated Sep. 25, 2025 in Application No. 22211338.3.

* cited by examiner

INDICATORS FOR USE IN OXYGEN SYSTEMS

CROSS-REFERENCE TO RELATED APPLICATIONS

This application is a non-provisional of, and claims priority to, and the benefit of India Provisional Application No. 202141059486 with DAS Code EA07, entitled "INDICATORS FOR USE IN OXYGEN SYSTEMS," filed on Dec. 20, 2021, which is hereby incorporated by reference in its entirety for all purposes.

FIELD

The present disclosure relates generally to indicators used for oxygen systems and, more particularly, to color indicators used for oxygen systems for aircrafts.

BACKGROUND

In response to low atmospheric pressure in an aircraft cabin, oxygen masks for each passenger drops down from a passenger service unit. Each oxygen mask includes a built-in testing device to verify whether the oxygen mask is functioning properly. If the oxygen mask is properly working, a light on the passenger service unit (e.g., above a head of a passenger). At higher altitudes, passengers only have a short duration to find a working oxygen mask (e.g., approximately 18-25 seconds above 35,000 ft).

SUMMARY

An oxygen system for an aircraft is disclosed herein. The oxygen system may comprise: a chemical oxygen generator; an oxygen mask; and a tube assembly extending from the chemical oxygen generator to the oxygen mask, the tube assembly comprising a first tube and a second tube, the first tube defining a fluid conduit that fluidly couples the chemical oxygen generator to the oxygen mask in response to being in use, the second tube configured to house a plurality of lights therein.

In various embodiments, the oxygen system may further comprise the plurality of lights. The plurality of lights may comprise a first set of lights and a second set of lights. The first set of lights may be configured to emit a first color, and wherein the second set of lights are configured to emit a second color that is different than the first color.

In various embodiments, the oxygen system may further comprise a controller in electrical communication with the plurality of lights. The controller may be configured to command the plurality of lights to emit a first color in response to determining the oxygen mask is operable and not in use, and wherein the controller is configured to command the plurality of lights to emit a second color in response to determining the oxygen mask is inoperable. The controller may be configured to command the plurality of lights to emit a third color in response to determining the oxygen mask is in use and operable.

In various embodiments, the first tube and the second tube define a chamber radially therebetween, and wherein the plurality of lights are disposed within the chamber.

An oxygen system for an aircraft is disclosed herein. The oxygen system may comprise: an oxygen mask; a tube assembly comprising a first tube and a second tube, the first tube defining a fluid conduit configured to transfer a fluid to the oxygen mask, the first tube and the second tube defining a chamber therebetween; and a plurality of lights disposed in the chamber.

In various embodiments, the oxygen system may further comprise a controller in electrical communication with the plurality of lights, the controller configured to electrically couple a first light in the plurality of lights to a power source in order to emit a first color in response to determining the oxygen mask is not in use and operable, the controller further configured to command a second light in the plurality of lights to the power source to emit a second color in response to determining the oxygen mask is inoperable. The controller may be further configured to electrically couple a third light in the plurality of lights to the power source to emit a third color in response to determining the oxygen mask is in use and operable.

In various embodiments, the first color is different from the second color.

In various embodiments, the oxygen system further comprises a chemical oxygen generator configured to be fluidly coupled to the oxygen mask via the fluid conduit during use of the oxygen system.

In various embodiments, the plurality of lights are spaced apart longitudinally along a length of the tube assembly.

In various embodiments, a passenger service unit in the aircraft comprises the oxygen system.

In various embodiments, an aircraft comprises the oxygen system.

A method is disclosed herein. The method may comprise: determining, via a processor, a status of an oxygen mask in an oxygen system; and commanding, via the processor, the oxygen system to emit a color from a plurality of lights in a tube assembly in the oxygen system in response to determining the status of the oxygen mask.

In various embodiments, the color is a first color in response to the status being operable and not in use, and wherein the color is a second color in response to the status being inoperable.

In various embodiments, the first color is different from the second color. The color may be a third color in response to the status being operable and in use, the third color being different from the first color and the second color.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
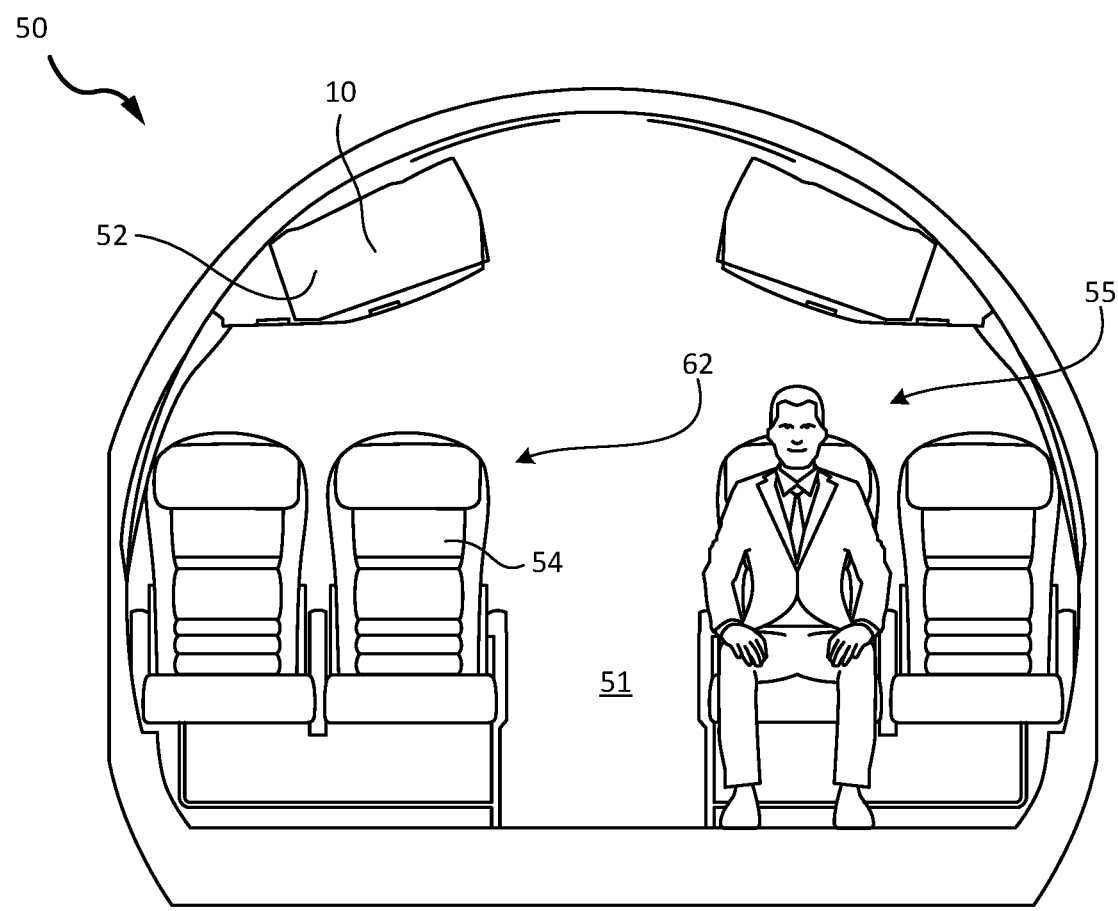
FIG. 1A illustrates a view of a cabin of an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

During a low atmospheric event in an aircraft cabin, a few of the oxygen masks may not function properly. In this regard, the built in test would identify the oxygen masks that are not working properly and send a signal to avionics and/or a light in a passenger service unit to turn on to indicate the oxygen mask is not working properly. However, the indicator light may be difficult to look at during a low atmospheric event when all masks are down. Additionally for people being helped, such as old passengers and children, a flight attendant has to quickly and decisively find a nearest working oxygen mask.

Disclosed herein is an oxygen system for an aircraft cabin. The oxygen system includes a plurality of oxygen mask assemblies. Each oxygen mask assembly comprises an oxygen mask and a tube assembly extending from the oxygen mask to a chemical oxygen generator. In various embodiments, the chemical oxygen generator may be configured for multiple oxygen mask assemblies or a single oxygen mask assembly. The present disclosure is not limited in this regard. In various embodiments, the tube assembly comprises a fluid conduit configured to transfer fluid from the chemical oxygen generator to the oxygen mask. In various embodiments, the tube assembly further comprises a chamber disposed radially outward of the fluid conduit. The chamber may include a plurality of lights disposed therein. In various embodiments, each light in the plurality of lights may comprise a light emitting diode (LED); however, the present disclosure is not limited in this regard. In various embodiments, the plurality of lights may be coupled to a controller. The controller may be a component of each oxygen mask assembly or a main controller for the oxygen system, the present disclosure is not limited in this regard. In various embodiments, the plurality of lights, based on instructions from the controller, are configured to display a color indicator based on a mask status. For example, in response to a mask not working, the color indicator may be red. In response to a mask working and not being used, the color indicator may be green. In response to a mask working and being used, the plurality of lights may be off or another color indicator may be shown, such as blue, or the like. In this regard, the tube assembly for each oxygen mask assembly is configured as an indicator as to a mask status for each oxygen mask, in accordance with various embodiments. Thus, as the indicator is at eye level with various passengers, each passenger and crew member may more quickly identify working masks, non-working masks and available masks.

With reference to FIG. 1A, a cabin 51 of an aircraft 50 is shown, according to various embodiments. The aircraft 50 may be any aircraft such as an airplane, a helicopter, or any other aircraft. The aircraft 50 may include a passenger service unit (PSU) 10 corresponding to each row of seats 62. The cabin 51 may include overhead bins 52, passenger seats 54 forming the row of passenger seats 62 for supporting passengers 55, etc. In various embodiments, the PSU 10 may be integral with the overhead bins 52 or the PSU 10 may be separate from the overhead bins 52. The present disclosure is not limited in this regard.

Figure 1B:
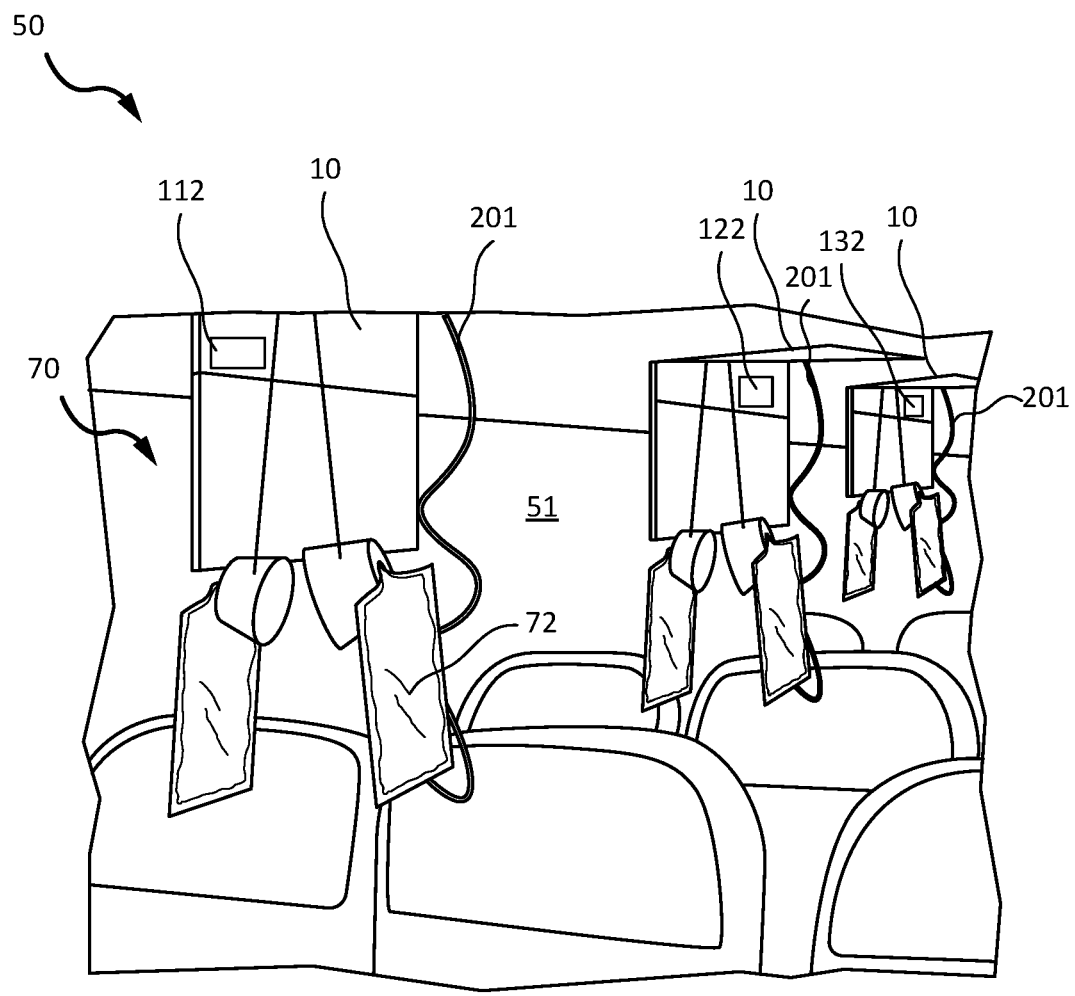
FIG. 1B illustrates a perspective view of a cabin of an aircraft, in accordance with various embodiments

Referring now to FIG. 1B, a perspective view of the cabin 51 of the aircraft 50 from FIG. 1A is illustrated with a plurality of oxygen mask assemblies 70 in a deployed position. Each mask assembly in the plurality of oxygen mask assemblies 70 may be deployed from a PSU 10. Each PSU may comprise a release mechanism (e.g., release mechanism 112, 122, 132), such as an actuator based lock or the like. The present disclosure is not limited in this regard and any release mechanism is within the scope of this disclosure.

In various embodiments, each oxygen mask assembly in the plurality of oxygen mask assemblies 70 comprises a tube assembly 201. The tube assembly 201 is configured to transfer a fluid (e.g., oxygen gas) from a chemical oxygen generator to a respective oxygen mask 72. In this regard, each tube assembly (e.g., tube assembly 201) may comprise a fluid conduit configured to transfer the fluid from the chemical oxygen generator to the respective oxygen mask 72.

Figure 2:
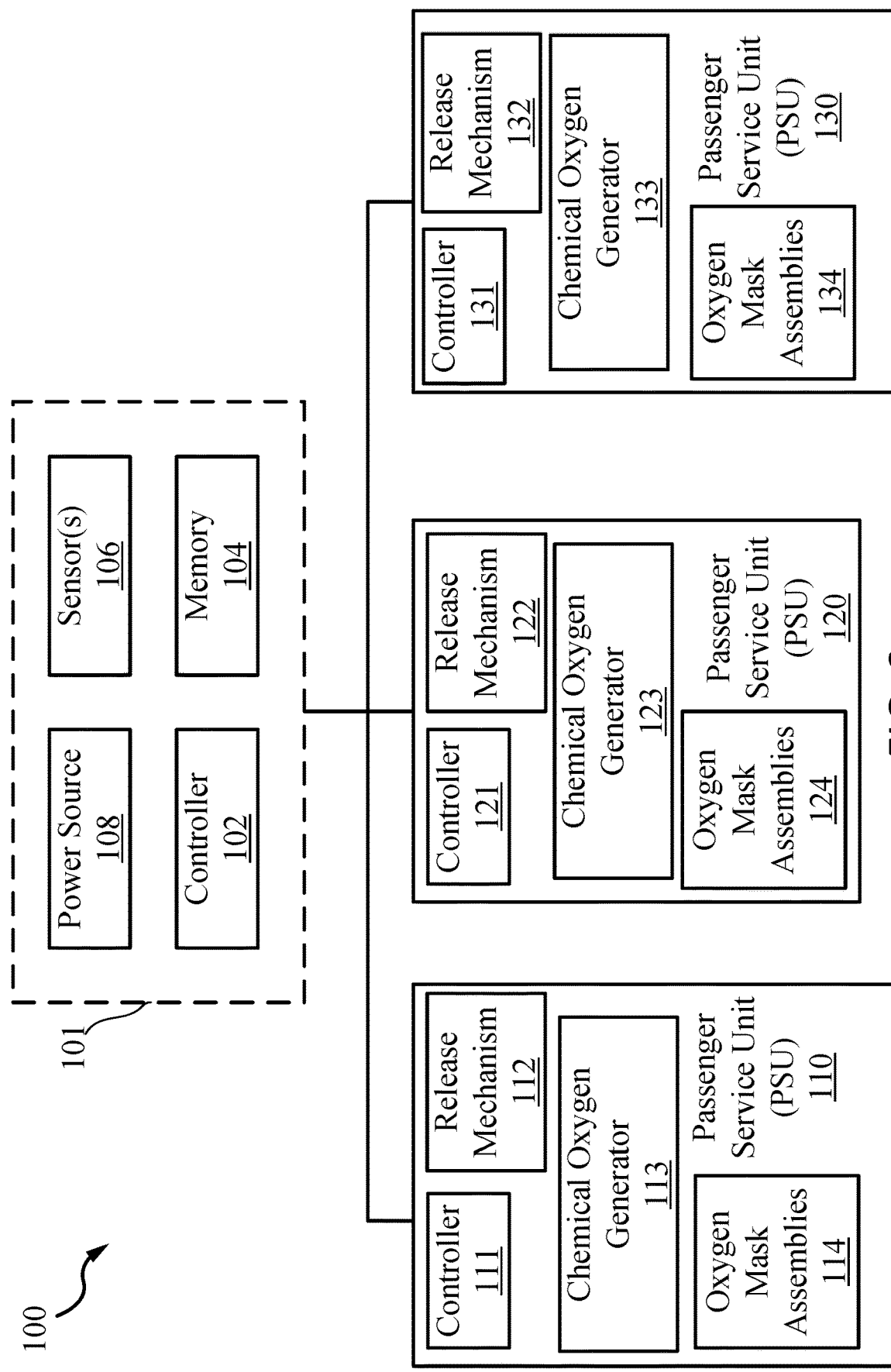
FIG. 2 illustrates a schematic view of an oxygen system, in accordance with various embodiments.

Referring now to FIG. 2 a schematic view of an oxygen system 100 for an aircraft cabin, is illustrated, in accordance with various embodiments. In various embodiments, the oxygen system 100 comprises a main control system 101 and a plurality of PSUs (e.g., first PSU 110, second PSU 120, third PSU 130, etc.). Although illustrated as including three PSUs, the number of PSUs of an oxygen system 100 is not limited in this regard. For example, a PSU may be disposed in each row of seats disposed in a respective column of an aircraft cabin. For example, a cabin with 50 rows and 3 columns may have 150 PSUs (e.g., each row in each column having a PSU). In various embodiments, the PSUs are not limited to rows in the aircraft cabin and may be placed throughout the aircraft cabin as well.

In various embodiments, the main control system 101 includes a controller 102 and a memory 104 (e.g., a database or any appropriate data structure; hereafter "memory 104" also may be referred to as "database 104"). The controller 102 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., controller 102 may utilize one or more processors of any appropriate type/configuration, may utilize any appropriate processing architecture, or both). In various embodiments, the controller 102 may further include any non-transitory memory known in the art. The memory 104 may store instructions usable by the logic device to perform operations. Any appropriate computer-readable type/configuration may be utilized as the memory 104, any appropriate data storage architecture may be utilized by the memory 104, or both.

The database 104 may be integral to the control system 101 or may be located remote from the control system 101. The controller 102 may communicate with the database 104 via any wired or wireless protocol. In that regard, the controller 102 may access data stored in the database 104. In various embodiments, the controller 102 may be integrated into computer systems onboard an aircraft. Furthermore, any number of conventional techniques for electronics configuration, signal processing and/or control, data processing and the like may be employed. Also, the processes, functions, and instructions may include software routines in conjunction with processors, etc.

System program instructions and/or controller instructions may be loaded onto a non-transitory, tangible computer-readable medium having instructions stored thereon that, in response to execution by the processor, cause the controller 102 to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found in In Re Nuijten to fall outside the scope of patentable subject matter under 35 U.S.C. § 101.

The instructions stored on the memory 104 of the controller 102 may be configured to perform various operations, such as determining a cabin air pressure has dropped below a threshold pressure, commanding release of a plurality of oxygen masks, initiating a start of chemical oxygen generators, etc.

In various embodiments, the main control system 101 from FIG. 2 further comprises a power source 108 and sensor(s) 106. The power source 108 may comprise any power source known in the art, such as a battery, a solar source, an alternating current (AC) source, a rechargeable source, or the like. In various embodiments, the sensor(s) 106 may be spaced about the aircraft 50 from FIG. 1A. In various embodiments, the sensor(s) 106 may comprise pressure sensors. In this regard, the sensor(s) 106 may be configured to measure an aircraft cabin pressure and relay the measurements to the controller 102. Thus, the controller 102 may determine whether the aircraft pressure has dropped below a pressure threshold, and release the oxygen masks as described further herein.

In various embodiments, the main control system 101 is in operable communication with each PSU in the plurality of PSUs (e.g., PSUs 110, 120, 130). In various embodiments, each PSU comprises a local controller (e.g., controllers 111, 121, 131). Each local controller (e.g., controllers 111, 121, 131) may be in accordance with main controller 102). For example, each local controller (e.g., controllers 111, 121, 131) may include one or more logic devices such as one or more of a central processing unit (CPU), an accelerated processing unit (APU), a digital signal processor (DSP), a field programmable gate array (FPGA), an application specific integrated circuit (ASIC), or the like (e.g., controllers 111, 121, 113)1 may utilize one or more processors of any appropriate type/configuration, may utilize any appropriate processing architecture, or both). In various embodiments, the controllers 111, 121, 131 may each further include any non-transitory memory known in the art. The memory may store instructions usable by the logic device to perform operations. Any appropriate computer-readable type/configuration may be utilized as the memory, any appropriate data storage architecture may be utilized by the memory, or both.

In various embodiments, each PSU (e.g., PSUs 110, 120, 130) may comprise a release mechanism (e.g., release mechanism 112, 122, 132), a chemical oxygen generator (e.g., chemical oxygen generator 113, 123, 133), and oxygen mask assemblies (e.g., oxygen mask assemblies 114, 124, 134). In various embodiments, the oxygen mask assemblies 114, 124, 134 may be integrated with a status indicator system as described further herein. In this regard, the oxygen mask assemblies 114, 124, 134 may be configured to emit a color based on a status of a respective oxygen mask assembly (e.g., oxygen mask assemblies 114, 124, 134) in the plurality of oxygen mask assemblies 70 from FIG. 1B. As described further herein, the controller 102 may command the various local controllers (e.g., controllers 111, 121, 131) to instruct the devices therein. For example, the controller 102 may command the release mechanisms 112, 122, 132 to release the oxygen mask assemblies 114, 124, 134, command the chemical oxygen generator 113, 123, 133 to activate, etc.

Figure 3:
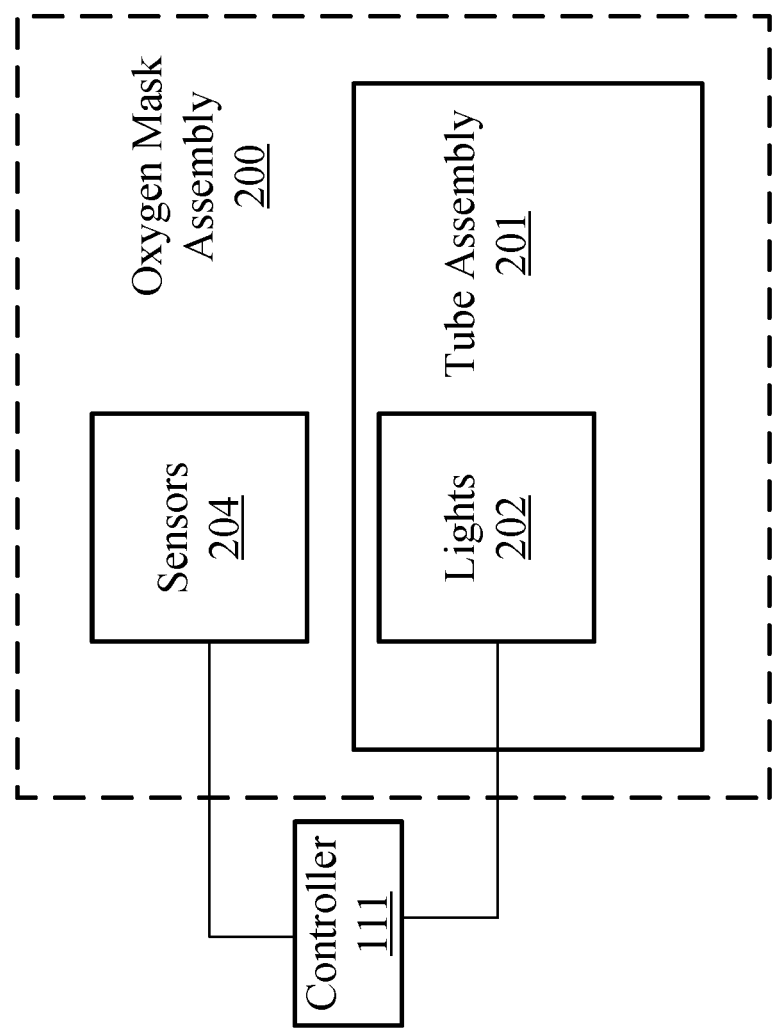
FIG. 3 illustrates a schematic view of an oxygen mask assembly, in accordance with various embodiments.

Referring now to FIG. 3, a schematic view of an oxygen mask assembly 200 of the oxygen mask assemblies 114, 124, 134 from FIG. 2 in the plurality of oxygen mask assemblies 70 from FIG. 1B is illustrated, in accordance with various embodiments. The oxygen mask assembly 200 comprises a tube assembly 201 and sensors 204. The tube assembly 201 comprises lights 202. In various embodiments, lights 202 may be a plurality of lights 202 configured to emit various colors, a plurality of lights comprising a first set of lights and a second set of lights, or a plurality of lights comprising a first set of lights, a second set of lights, and a third set of lights. The present disclosure is not limited in this regard. For example, if only two sets of lights in the lights 202, the lights 202 may be configured to emit a first color of light (e.g., green) via the first set of lights in response to the controller 111 determining that the oxygen mask assembly 200 is functioning properly and not in use, the lights 202 may be configured to emit a second color light (e.g., red) in response to the controller 111 determining that the oxygen mask assembly 200 is not functioning properly, and to emit no light in response to the controller 111 determining the oxygen mask assembly 200 functioning properly and in use. Similarly, if there are three sets of lights in the lights the lights 202, the lights 202 may be configured to emit a first color of light (e.g., green) via the first set of lights in response to the controller 111 determining that the oxygen mask assembly 200 is functioning properly and not in use, the lights 202 may be configured to emit a second color light (e.g., red) in response to the controller 111 determining that the oxygen mask assembly 200 is not functioning properly, and to emit a third color light (e.g., blue) in response to the controller 111 determining the oxygen mask assembly 200 functioning properly and in use.

In various embodiments, the sensors 204 may comprise any type of sensor that measures oxygen flowing properly in the oxygen mask assembly 200 (e.g., an oxygen gas detector, an oxygen sensor, or the like). The present disclosure is not limited in this regard. In various embodiments, the sensors 204 may be external to the tube assembly 201 or integrated within the tube assembly 201. The present disclosure is not limited in this regard. In various embodiments, the sensors 204 may be disposed within a fluid conduit of the tube assembly 201 as described further herein.

Figure 4:
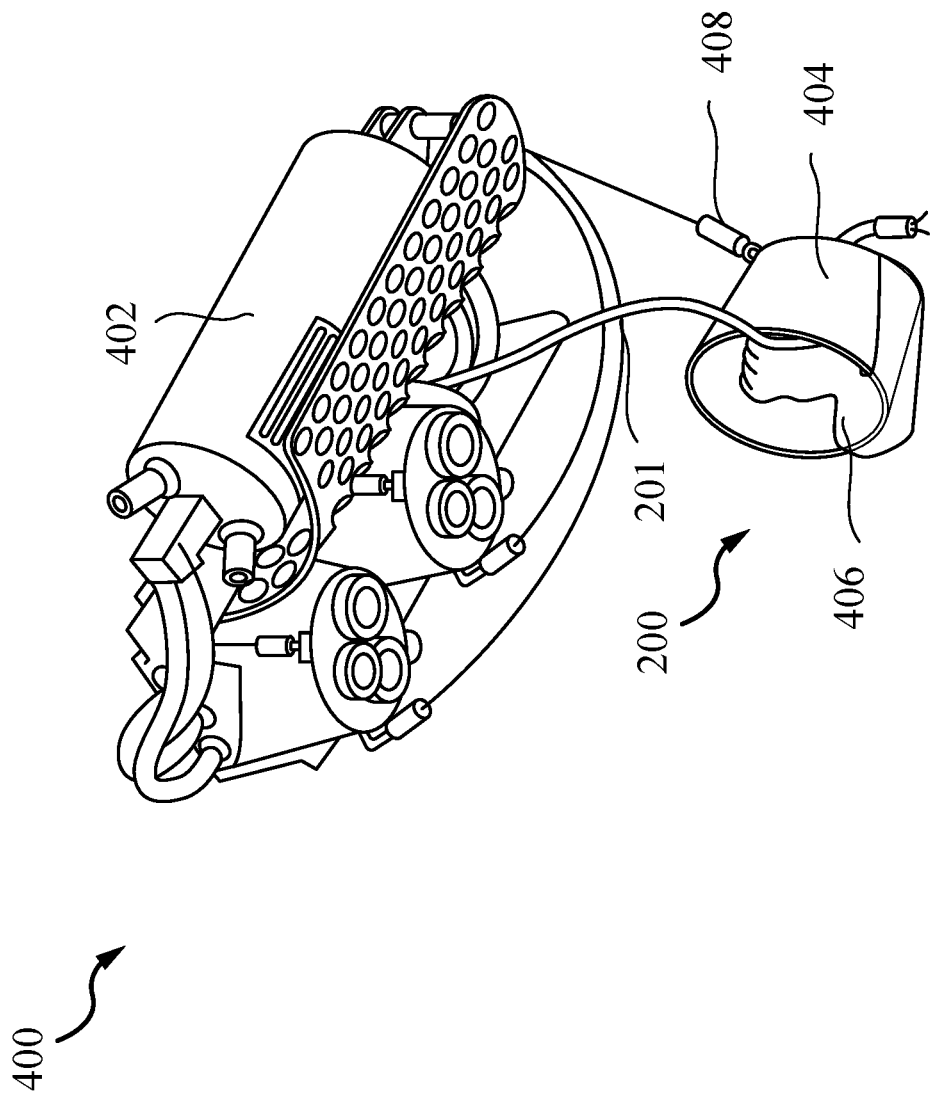
FIG. 4 illustrates a perspective view of an oxygen system, in accordance with various embodiments.

Referring now to FIG. 4, a perspective view of an oxygen system 400 comprising an oxygen mask assembly 200 with a tube assembly 201 is illustrated, in accordance with various embodiments. The oxygen system 400 comprises a chemical oxygen generator 402, the tube assembly 201, an oxygen mask 404, an oxygen bag 406, and a release mechanism 408. In various embodiments, the release mechanism 408 may be configured to release the oxygen mask 404 in a downward direction in response to the controller 102 from FIG. 2 determining the aircraft cabin pressure is below a pressure threshold. In this regard, in response to the controller 102 commanding the release mechanism 408 to release the oxygen mask 404, the release mechanism 408 is actuated, releasing the oxygen mask 404, in accordance with various embodiments.

Figure 5:
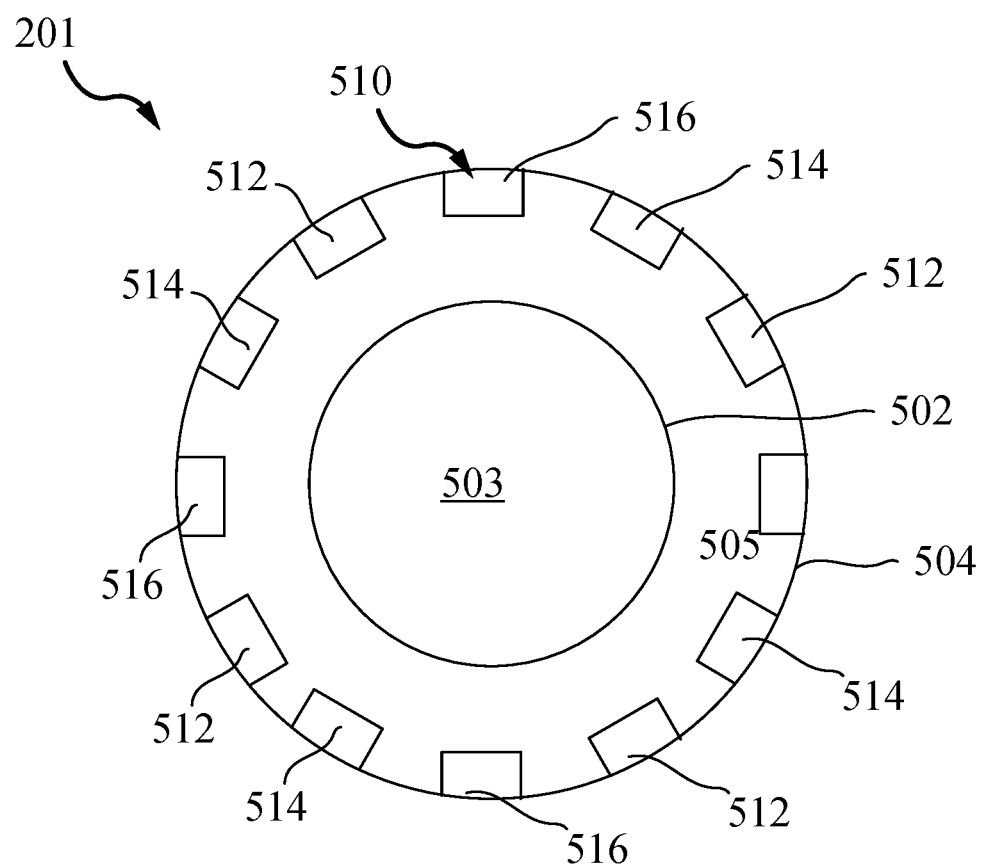
FIG. 5 illustrates a cross-sectional view of a tube assembly, in accordance with various embodiments.

Referring now to FIG. 5, a cross-sectional view of a tube assembly 201 is illustrated, in accordance with various embodiments. In various embodiments, the tube assembly 201 comprises a first tube 502 defining a fluid conduit 503. In various embodiments, the tube assembly comprises a second tube 504 disposed radially outward of the first tube. In various embodiments, the second tube 504 and the first tube 502 define a chamber 505 radially therebetween. In various embodiments, disposed within the chamber 505 are a plurality of lights 510. The plurality of lights 510 are in electrical communication with a controller (e.g., controller 102, 111, 121, 131). In this regard, the plurality of lights 510 are configured to be electrically coupled to a power source (e.g., power source 108 from FIG. 2) to emit a color in response to the controller determining a status of the oxygen system 400 from FIG. 4. Although described herein as coupling the power source to a respective light to display a respective color, the present disclosure is not limited in this regard. For example, a light configured to emit multiple colors may be commanded to display a color in the multiple colors based on a determined status of the oxygen system 400 from FIG. 4, in accordance with various embodiments.

The plurality of lights 510 may be spaced about circumferentially about the second tube 504. In various embodiments, the plurality of lights 510 may be spaced about longitudinally within tube assembly 201 as well. In various embodiments, the plurality of lights 510 may only be spaced apart longitudinally in the tube assembly 201. The present disclosure is not limited in this regard. A majority of a longitudinal length of the tube assembly 201 may comprise the plurality of lights 510, in accordance with various embodiments. In various embodiments, the plurality of lights 510 comprise a first set of lights 512, a second set of lights 514, and a third set of lights 516. Although described herein as comprising three sets of lights 510, the present disclosure is not limited in this regard. For example, as described previously herein, the plurality of lights 510 may comprise a single set of lights configured to emit multiple colors, two sets of lights, or the like.

Figure 6:
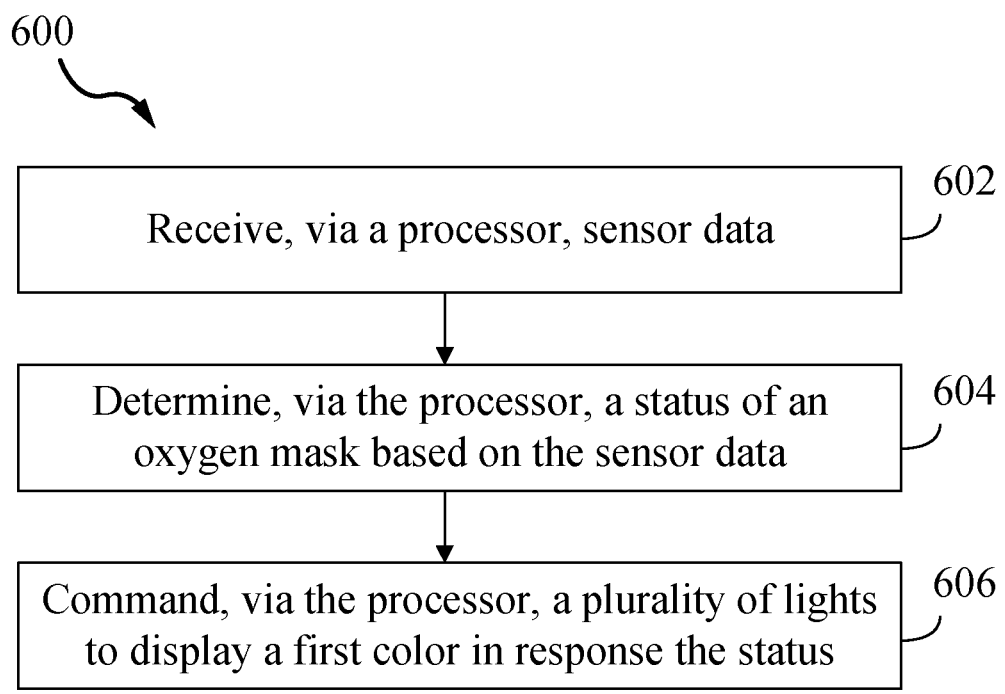
FIG. 6 illustrates a method of operating an indication system for an oxygen system, in accordance with various embodiments.

Referring now to FIG. 6, a method 600 of providing a status indicator for an oxygen mask assembly is illustrated, in accordance with various embodiments. The method comprises receiving, via a processor, sensor data (step 602). The sensor data may include oxygen data (i.e., whether oxygen is flowing from a chemical oxygen generator 402 to a oxygen bag 406 from FIG. 4, in accordance with various embodiments. In various embodiments, the sensor data may include flow data corresponding to an amount of oxygen flowing into the oxygen bag 406). In this regard, based on the sensor data, the processor can determine a status of an oxygen mask 404 from FIG. 4 (i.e., operable and in use, operable and not in use, or inoperable) (step 604). In various embodiments, the method 600 further comprises commanding, via the processor a plurality of lights to display a color in response to the status (step 606). In various embodiments, the color may comprise a first color, or no color, in response to determining the status is operable and in use (e.g., blue or no color at all), the color may comprise a second color in response determining the status is operable and not in use (e.g., green), and the color may comprise a third color in response to determining the status is inoperable (e.g., red). In various embodiments, the plurality of lights are a component within a tube assembly (e.g., tube assembly 201 from FIGS. 1B, 3, 4, 5). In this regard, the plurality of lights may be visible to various passengers and crew members during a low pressure event in an aircraft cabin 50 from FIG. 1A.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An oxygen system for an aircraft, the oxygen system comprising:
    a chemical oxygen generator;
    an oxygen mask; and
    a tube assembly comprising a first tube and a second tube, each of the first tube and the second tube extending from the chemical oxygen generator to the oxygen mask, the first tube defining a fluid conduit that fluidly couples the chemical oxygen generator to the oxygen mask in response to being in use, the second tube configured to house a plurality of lights therein,
    wherein the first tube and the second tube define a chamber radially therebetween, and wherein the plurality of lights are disposed within the chamber, wherein the first tube comprising an outer circumferential surface and the second tube comprising an inner circumferential surface, the chamber is positioned between the outer circumferential surface of the first tube and the inner circumferential surface of the second tube, and wherein at a section of the tube assembly, and the chamber extend around the entire outer circumferential surface of the first tube to surround the first tube at the section of the tube assembly.

2. The oxygen system of claim 1, wherein further comprising the plurality of lights extends along a majority of a longitudinal length of the tube assembly.

3. The oxygen system of claim 2, wherein the plurality of lights comprise a first set of lights and a second set of lights.

4. The oxygen system of claim 3, wherein the first set of lights are configured to emit a first color, and wherein the second set of lights are configured to emit a second color that is different than the first color.

5. The oxygen system of claim 2, further comprising a controller in electrical communication with the plurality of lights.

6. The oxygen system of claim 5, wherein the controller is configured to command the plurality of lights to emit a first color in response to determining the oxygen mask is operable and not in use, and wherein the controller is configured to command the plurality of lights to emit a second color in response to determining the oxygen mask is inoperable.

7. The oxygen system of claim 6, wherein the controller is configured to command the plurality of lights to emit a third color in response to determining the oxygen mask is in use and operable.

8. The oxygen system of claim 1, the chamber is recessed from an outer diameter of the tube assembly.

9. An oxygen system for an aircraft, comprising:
    an oxygen mask;
    a tube assembly comprising a first tube and a second tube, the first tube defining a fluid conduit configured to transfer a fluid to the oxygen mask, the first tube and the second tube defining a chamber therebetween; and
    a plurality of lights disposed in the chamber and extending along a majority of a longitudinal length of the tube assembly, wherein the first tube comprising an outer circumferential surface and the second tube comprising an inner circumferential surface, the chamber is positioned between the outer circumferential surface of the first tube and the inner circumferential surface of the second tube, and wherein at a section of the tube assembly, and the chamber extend around the entire outer circumferential surface of the first tube to surround the first tube at the section of the tube assembly.

10. The oxygen system of claim 9, further comprising a controller in electrical communication with the plurality of lights, the controller configured to electrically couple a first light in the plurality of lights to a power source in order to emit a first color in response to determining the oxygen mask is not in use and operable, the controller further configured to command a second light in the plurality of lights to the power source to emit a second color in response to determining the oxygen mask is inoperable.

11. The oxygen system of claim 10, wherein the controller is further configured to electrically couple a third light in the plurality of lights to the power source to emit a third color in response to determining the oxygen mask is in use and operable.

12. The oxygen system of claim 10, wherein the first color is different from the second color.

13. The oxygen system of claim 9, wherein the oxygen system further comprises a chemical oxygen generator configured to be fluidly coupled to the oxygen mask via the fluid conduit during use of the oxygen system.

14. The oxygen system of claim 9, wherein the plurality of lights are spaced apart longitudinally along a length of the tube assembly.

15. A passenger service unit in the aircraft, comprising the oxygen system of claim 9.

16. An aircraft, comprising the oxygen system of claim 9.

17. A method, comprising:
    determining, via a processor, a status of an oxygen mask in an oxygen system; and
    commanding, via the processor, the oxygen system to emit a color from a plurality of lights extending along a majority of a longitudinal length of a tube assembly in the oxygen system in response to determining the status of the oxygen mask, wherein the tube assembly comprising a first tube and a second tube, the first tube and the second tube define a chamber radially therebetween, and wherein the plurality of lights are disposed within the chamber, wherein the first tube comprising an outer circumferential surface and the second tube comprising an inner circumferential surface, the chamber is positioned between the outer circumferential surface of the first tube and the inner circumferential surface of the second tube, and wherein at a section of the tube assembly, the chamber extend around the entire outer circumferential surface of the first tube to surround the first tube at the section of the tube assembly.

18. The method of claim 17, wherein the color is a first color in response to the status being operable and not in use, and wherein the color is a second color in response to the status being inoperable.

19. The method of claim 18, wherein the first color is different from the second color.

20. The method of claim 19, wherein the color is a third color in response to the status being operable and in use, the third color being different from the first color and the second color.

* * * * *